(12) United States Patent
Kanda et al.

(10) Patent No.: US 9,422,939 B2
(45) Date of Patent: Aug. 23, 2016

(54) ELECTRIC MOTOR AND ELECTRIC UNIT INCLUDING THE SAME

(71) Applicant: JTEKT CORPORATION, Osaka-shi, Osaka (JP)

(72) Inventors: Naotake Kanda, Yamatokoriyama (JP); Yoshihiro Oono, Katsuragi (JP)

(73) Assignee: JTEKT CORPORATION, Osaka (JP)

( * ) Notice: Subject to any disclaimer, the term of this patent is extended or adjusted under 35 U.S.C. 154(b) by 447 days.

(21) Appl. No.: 13/679,398

(22) Filed: Nov. 16, 2012

(65) Prior Publication Data

US 2013/0136633 A1    May 30, 2013

(30) Foreign Application Priority Data

Nov. 25, 2011  (JP) ................................. 2011-257481

(51) Int. Cl.
| | |
|---|---|
| H02K 5/04 | (2006.01) |
| F04D 13/06 | (2006.01) |
| H02K 1/18 | (2006.01) |
| H02K 5/173 | (2006.01) |
| H02K 7/14 | (2006.01) |
| H02K 15/16 | (2006.01) |

(Continued)

(52) U.S. Cl.
CPC ................ *F04D 13/06* (2013.01); *H02K 1/185* (2013.01); *H02K 5/1732* (2013.01); *H02K 7/14* (2013.01); *H02K 15/16* (2013.01); *F04C 2240/805* (2013.01); *H02K 5/15* (2013.01); *H02K 7/1166* (2013.01)

(58) Field of Classification Search
CPC ................................................ F04C 2240/805
USPC ...... 310/75 R, 89, 400; 417/423.14; 74/606 R
See application file for complete search history.

(56) References Cited

U.S. PATENT DOCUMENTS

| | | | | |
|---|---|---|---|---|
| 4,186,319 A | * | 1/1980 | Dochterman | 310/89 |
| 4,464,593 A | * | 8/1984 | Kofink | 310/58 |
| 4,931,678 A | * | 6/1990 | Lutz | 310/62 |

(Continued)

FOREIGN PATENT DOCUMENTS

| | | | | |
|---|---|---|---|---|
| EP | 2 469 102 | * | 6/2012 | F04D 29/62 |
| JP | H06-60793 U | | 8/1994 | |

(Continued)

OTHER PUBLICATIONS

English Machine Translation, Koyama, JP 2003343438, Dec. 2003.*

(Continued)

*Primary Examiner* — Burton Mullins
(74) *Attorney, Agent, or Firm* — Oliff PLC

(57) ABSTRACT

A pump housing, a fixing member and a holding member are assembled in the axis direction of an oil pump to fix a stator and a rotor of a brushless motor. The holding member is made of metal material and has a cylindrical shape that extends from its bottom portion toward one side in the axial direction. The fixing member is a cylindrical metal member. Stepped portions, extending in the circumferential direction, are formed in the outer periphery of the holding member and the inner periphery of the fixing member, and contact each other. The outer periphery of the holding member engages with the inner periphery of the fixing member. The outer periphery of the other end portion of the fixing member is fitted to the inner periphery of a flange portion projecting from the end face of the pump housing, which is adjacent to the brushless motor.

14 Claims, 3 Drawing Sheets

(51) Int. Cl.
 *H02K 5/15* (2006.01)
 *H02K 7/116* (2006.01)

(56) References Cited

U.S. PATENT DOCUMENTS

| | | | |
|---|---|---|---|
| 5,448,118 A * | 9/1995 | Nakamura | H02K 9/19 |
| | | | 310/54 |
| 5,514,922 A | 5/1996 | Yabushita et al. | |
| 5,616,973 A * | 4/1997 | Khazanov et al. | 310/54 |
| 5,747,905 A * | 5/1998 | Yabushita et al. | 310/89 |
| 6,203,294 B1 | 3/2001 | Turley et al. | |
| 6,218,747 B1 * | 4/2001 | Tsuruhara | 310/54 |
| 6,699,024 B2 * | 3/2004 | Dong | F03C 2/08 |
| | | | 418/61.3 |
| 2009/0127953 A1 | 5/2009 | Yumoto et al. | |
| 2011/0194954 A1 | 8/2011 | Sakata et al. | |

FOREIGN PATENT DOCUMENTS

| | | | | |
|---|---|---|---|---|
| JP | 2003-343438 | * | 12/2003 | F04B 39/00 |
| JP | 2005-291004 | * | 10/2005 | F04B 39/12 |
| JP | 2006-274921 A | | 10/2006 | |
| JP | A-2006-274921 | | 10/2006 | |
| JP | 2008-175090 A | | 7/2008 | |
| JP | A-2010-116914 | | 5/2010 | |

OTHER PUBLICATIONS

Jun. 22, 2015 Search Report issued in European Patent Application No. 12193813.8.

Jun. 30, 2015 Office Action issued in Japanese Patent Application No. 2011-257481.

\* cited by examiner

ELECTRIC MOTOR AND ELECTRIC UNIT INCLUDING THE SAME

INCORPORATION BY REFERENCE/RELATED APPLICATION

This application claims priority to Japanese Patent Application No. 2011-257481 filed on Nov. 25, 2011 the disclosure of which, including the specification, drawings and abstract, is incorporated herein by reference in its entirety.

BACKGROUND OF THE INVENTION

1. Field of the Invention

The invention relates to an electric motor and an electric unit including the electric motor.

2. Discussion of Background

There is a conventional electric oil pump device that is formed by assembling together an oil pump that circulates fluid (oil) and an electric motor that drives the oil pump. As such an electric oil pump device, Japanese Patent Application Publication No. 2006-274921 (JP 2006-274921 A) suggests an electric oil pump device in which an electric motor and an oil pump are arranged side by side along the direction of the central axis of the oil pump and accommodated together in a common housing.

The electric oil pump device has a structure in which bearings are arranged at respective end portions of a motor shaft to provide support at two positions. Hence, the motor shaft becomes long, and a member that supports the bearing disposed on the opposite side of the motor shaft from the oil pump is required. Therefore, in order to reduce the length of a motor shaft to obtain a more compact electric oil pump device, Japanese Patent Application Publication No. 2010-116914 (JP 2010-116914 A) suggests an electric oil pump device in which a motor shaft is supported at one axial position in a cantilever manner by a bearing device in a housing.

In an electric motor used in the electric oil pump device or in an electric power steering system, whirling of a motor shaft may become large due to, for example, runout, backlash or eccentricity between a stator and a rotor of the electric motor, or an attraction force generated by unbalance between the stator and the rotor and therefore vibrations or abnormal noise of the electric motor may be generated. When bearings are arranged at respective end portions of a motor shaft to reduce vibrations and abnormal noise of an electric motor, it is necessary to accurately perform centering of the inner periphery of a stator and centering of a rotor that is supported by the bearings at the respective end portions of the motor shaft.

SUMMARY OF THE INVENTION

The invention provides an electric motor that is assembled with high accuracy and an electric unit that includes the electric motor.

According to a feature of an example of the invention, an outer periphery of a fixing member is fitted to an inner periphery of a flange portion that projects from an end face of a housing of a rotated member that is disposed adjacent to an electric motor and that serves as a load of the electric motor, and an outer periphery of a holding member is fitted to an inner periphery of the fixing member, to form the electric motor.

It is possible to easily perform centering of a rotor supported by bearings arranged at two positions, via the holding member, and to perform centering of the stator via the fixing member, using the outer diameters of the rotor and the stator as references. As a result, it is possible to suppress generation of vibrations and abnormal noise of the electric motor. Furthermore, stepped portions, extending in the circumferential direction, are formed respectively in an axial end portion of the outer periphery of the holding member and an axial end portion of the inner periphery of the fixing member, and are brought into contact with each other. Therefore, when the housing of the rotated member and the holding member are fastened with the bolts, the stator is pushed toward the housing of the rotated member via the fixing member by the fastening force of the bolts. Therefore, it is possible to perform centering of the stator and centering of the rotor at the same time, thereby reliably fixing the electric motor and the housing of the rotated member.

BRIEF DESCRIPTION OF THE DRAWINGS

The foregoing and further objects, features and advantages of the invention will become apparent from the following description of example embodiments with reference to the accompanying drawings, wherein like numerals are used to represent like elements, and wherein.

DETAILED DESCRIPTION OF EMBODIMENTS

Hereinafter, embodiments of the invention will be described with reference to the accompanying drawings.

Figure 1:
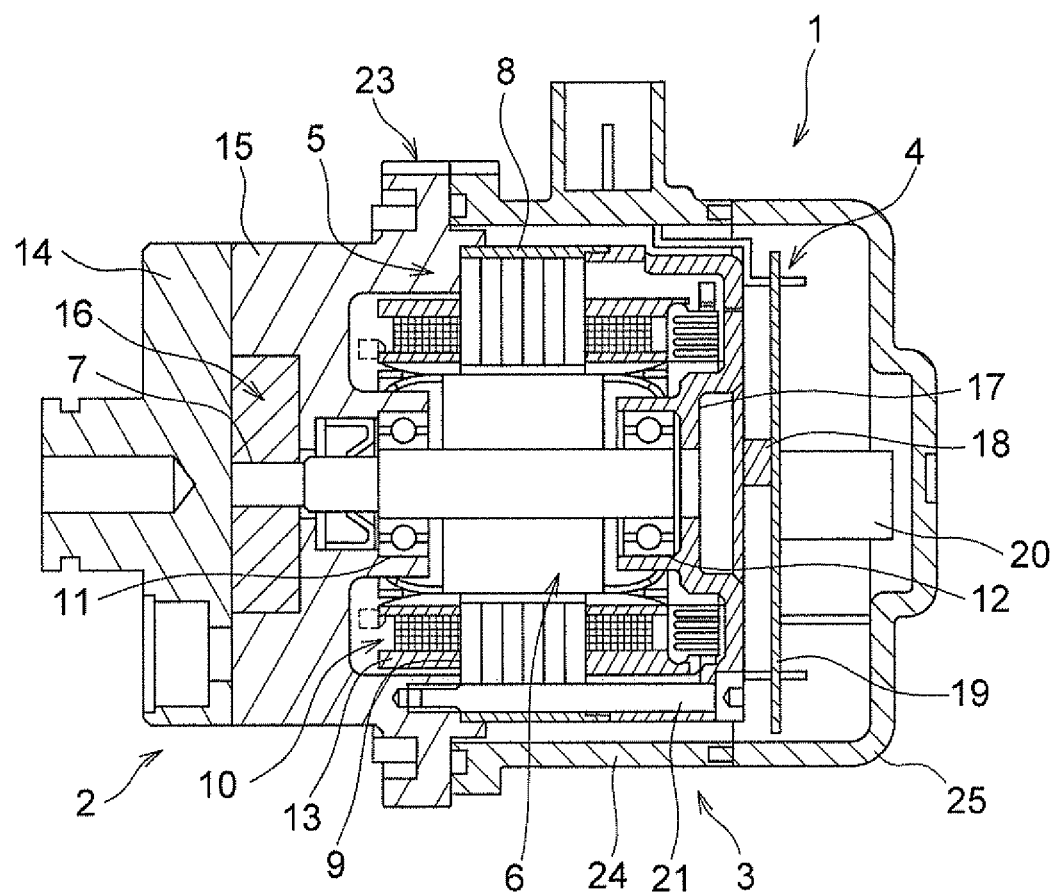
FIG. 1 is an axial sectional view showing the structure of an electric oil pump device according to an embodiment of the invention.

FIG. 1 is an axial sectional view showing the structure of an electric oil pump device 1 according to an embodiment of the invention. As shown in FIG. 1, the electric oil pump device (the electric unit) 1 is used as a hydraulic pump for an automobile transmission. In the electric oil pump device 1, an oil pump (e.g. an internal gear pump) 2 and an electric motor (hereinafter, referred to as "brushless motor") 3 that rotates the oil pump (an example of "rotated member" in the invention) 2 are arranged side by side and assembled together. In addition, a controller 4 is incorporated in a motor housing 24. The brushless motor 3 shown in FIG. 1 is a brushless sensorless motor that includes three-phase coils.

In the present embodiment, a trochoid pump is used as the oil pump 2. An inner rotor for a pump (hereinafter, referred to as "inner rotor") (not shown) that has external teeth is arranged radially inward of and meshed with an outer rotor for a pump (hereinafter, referred to as "outer rotor") (not shown) that has internal teeth having trochoid tooth profile, and the outer rotor and the inner rotor are eccentrically and rotatably arranged in a pump housing 15. In this way, a pump portion 16 is formed.

The inner rotor is securely fitted onto a rotary drive shaft 7 at a portion that is closer to one end of the rotary drive shaft 7 than a portion on which a rotor 6 of the brushless motor 3 is arranged. The inner rotor rotates together with the rotary drive shaft 7. The outer rotor has internal teeth of which the number is larger by one than that of the external teeth of the inner rotor. The outer rotor is disposed so as to be rotatable about an axis that is offset from the central axis of the rotary drive shaft 7 in the pump housing 15. The inner rotor rotates while the external teeth of the inner rotor mesh with the internal teeth of the outer rotor at some circumferential positions and each of the meshed external teeth of the inner rotor is substantially in contact with the inner face of the outer rotor at the corresponding circumferential position.

Therefore, when the rotary drive shaft 7 is rotated by the brushless motor 3, the volume of each space between the outer rotor and the inner rotor of the oil pump 2 is alternately increased and decreased during one rotation of the rotary drive shaft 7. In this way, a pumping action is carried out, that is, oil is sucked in from an inlet port (not shown) formed in a pump plate 14 and then discharged from an outlet port formed in the pump plate 14. The inlet port and the outlet port are communicated with the spaces.

The brushless motor 3 includes the rotary rotor 6 for a motor (hereinafter, referred to as "rotor"), and a stator 5 for a motor (hereinafter, referred to as "stator") fixed at a position radially outward of the outer periphery of the rotor 6. The rotor 6 is formed by arranging, for example, a plurality of permanent magnets (not shown) on the outer periphery of the rotary drive shaft 7 in the circumferential direction. The rotary drive shaft 7 is a rotary shaft shared by the brushless motor 3 and the oil pump 2, and respective end portions thereof are rotatably supported by bearings 11, 12 that are arranged in the pump housing 15 and a holding member 17, respectively. A plurality of bolts 21 passed through through-holes of the holding member 17 is screwed to the pump housing 15 made of metal. In this way, the stator 5 of the brushless motor 3 is fixed. In the present embodiment, three bolts 21 are arranged at equal intervals in the circumferential direction around the central axis.

The stator 5 has a plurality of teeth (not shown) of stator cores 9, which extend radially inward, and a small air gap is formed between the distal end of each tooth of the stator cores 9 and the outer periphery of the rotor 6. Three-phase coils 10 are wound around the teeth of the stator cores 9. A resin insulator 13 that insulates the coils 10 from the stator cores 9 is fitted to the stator cores 9 located at respective axial ends of the stator 5. The stator 5 is formed of a plurality of split stator cores 9, and the stator cores 9 are fastened and fixed at their peripheries by a cylindrical thin fixing member 8 made of metal.

End portions of the coils 10 are electrically connected to bus bars (not shown). The insulator 13 is molded integrally with the three bus bars that are used as drive terminals of the brushless motor 3. Each bus bar extends from the right end portion of the insulator 13 in parallel with the central axis.

The pump plate 14 and the pump housing 15 are made of nonmagnetic material. The motor housing 24 and a lid 25 that accommodate the brushless motor 3 and the controller 4 are made of resin material. A housing body of the electric oil pump device 1 is formed of the pump plate 14, the pump housing 15, the motor housing 24, and the lid 25. The motor housing 24 and the lid 25 constitute a waterproof cover.

In addition, a control substrate (hereinafter, referred to as "substrate") 19 of the controller 4, which is used to control the brushless motor 3, is attached to the electric oil pump device 1 in the present embodiment via a fastening portion 18 disposed on the holding member 17 made of metal and arranged in the motor housing 24. On the substrate 19, there is mounted a control circuit portion 20 formed of an inverter circuit and a control circuit. The inverter circuit converts a direct current from a power supply into an alternating current to supply a drive current to each of the coils 10 of the brushless motor 3. The control circuit controls the inverter circuit on the basis of information on the rotational position of the outer rotor, which is detected by a sensor such as a Hall element. Electronic components such as microcomputers, coils and capacitors of the inverter circuit and the control circuit that constitute the control circuit portion 20 of the controller 4 are mounted on both faces of the substrate 19.

The bus bars, which are used as the drive terminals of the brushless motor 3, connected to the coils 10, and insulated and supported by the insulator 13 are passed through the substrate 19 and connected to the control circuit portion 20 arranged on the substrate 19. At the side face of the motor housing 24, a connector shell is formed integrally with the motor housing 24, and a connector pin in the connector shell is connected to the control circuit portion 20 on the substrate 19.

With the above-described structure, the drive currents controlled by the control circuit portion 20 are supplied to the coils 10 of the brushless motor 3. Thus, rotating magnetic fields are generated in the coils 10, and torque is generated in the permanent magnets. As a result, the rotor 6 is rotated. When the inner rotor is rotated as the rotor 6 rotates, the outer rotor is rotated in accordance with the rotation of the inner rotor. Thus, the volume of each of the spaces between the internal teeth of the outer rotor and the external teeth of the inner rotor is alternately increased and decreased. In this way, the pumping action is carried out, that is, oil is sucked in from the inlet port and then discharged from the outlet port.

Figure 2:
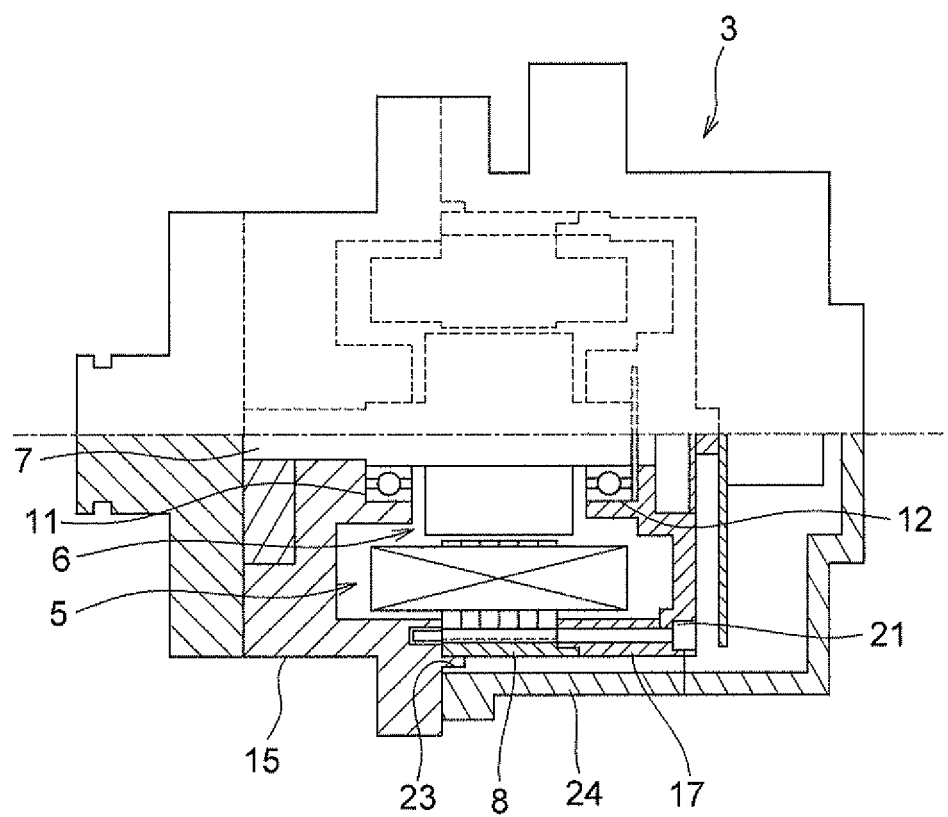
FIG. 2 is a sectional view showing the state where a pump housing and a brushless motor in FIG. 1 are assembled together.

Next, FIG. 2 is a sectional view showing the state where the pump housing 15 and the brushless motor 3 in FIG. 1 are assembled together. As shown in FIG. 2, the pump housing 15, the fixing member 8 and the holding member 17 are assembled together in the direction of the central axis of the oil pump 2 to fix the stator 5 and the rotor 6 of the brushless motor 3.

Specifically, the holding member 17 is made of metal material (e.g. an aluminum alloy) and has a cylindrical shape on one side, and the fixing member 8 is made of metal material (e.g. iron) and has a cylindrical shape. A stepped portion is formed in an axial end portion of the outer periphery of the holding member 17, and a stepped portion is formed in one axial end portion (right end portion in FIG. 2) of the inner periphery of the fixing member 8. The stepped portion of the holding member 17 and the stepped portion of the fixing member 8 extend in the circumferential direction, and are brought into contact with each other. The outer periphery of the stepped portion of the holding member 17 is engaged with the inner periphery of the stepped portion of the fixing member 8.

In addition, the outer periphery of the other axial end portion (left end portion in FIG. 2) of the fixing member 8 is fitted to the inner periphery of a cylindrical flange portion 23 that projects from the end face of the pump housing 15, which is adjacent to the brushless motor 3. With this structure, it is possible to reliably perform centering of the rotor 6 supported by the bearings 11, 12 arranged at respective end portions of the rotary drive shaft 7, via the holding member 17, and to reliably perform centering of the stator 5 via the fixing member 8.

Further, the bolts 21 passed through the through-holes formed in the holding member 17 are screwed to the pump housing 15, and the stator 5 of the brushless motor 3 is fixed to the motor housing 24 via the pump housing 15 with a space left between the stator 5 and the motor housing 24. When the bolts 21 are fastened, the brushless motor 3 is firmly fixed to the oil pump 2 by a fastening force between the pump housing 15 and the holding member 17.

Figure 3:
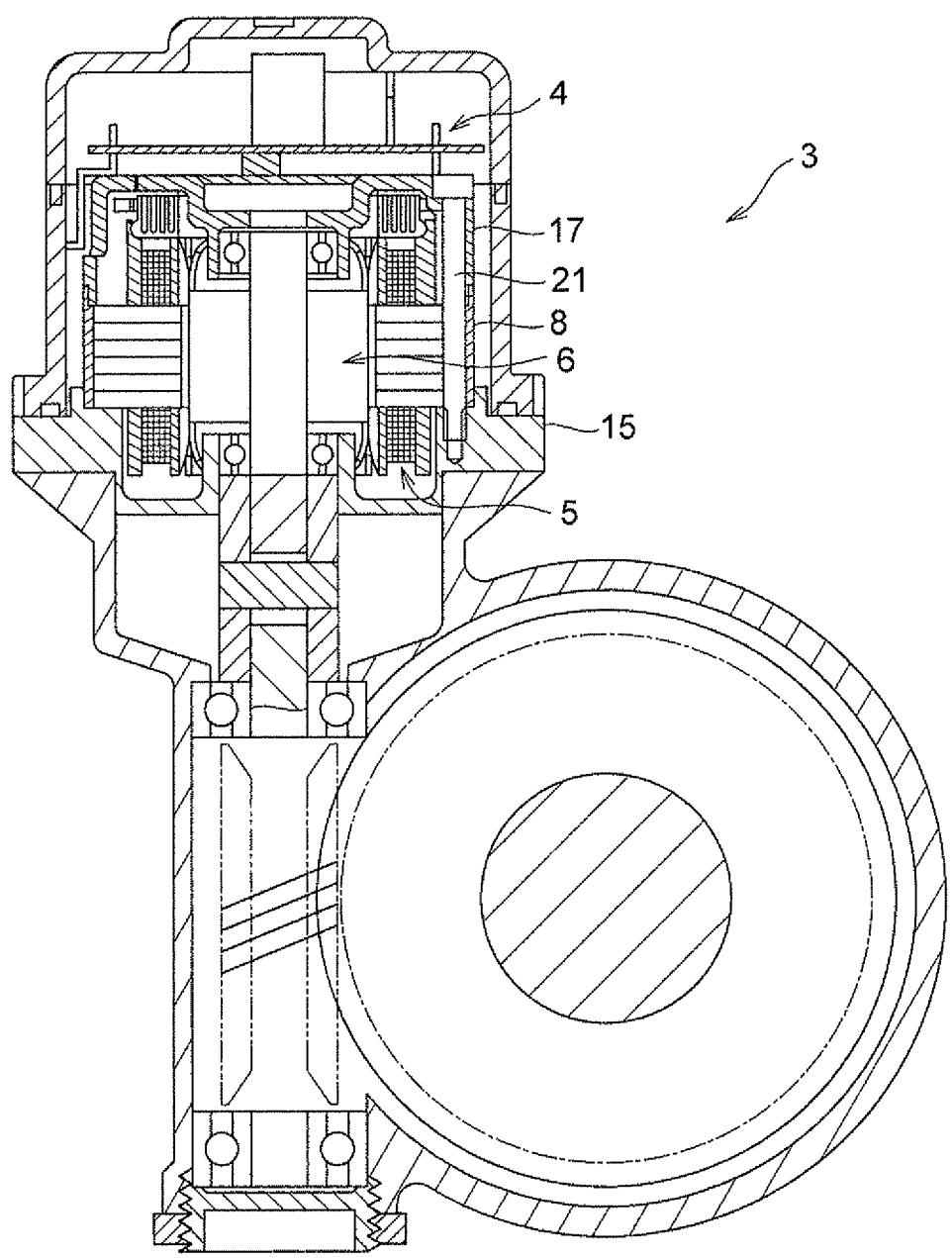
FIG. 3 is an axial sectional view showing the structure of an electric power steering system according to another embodiment of the invention.

FIG. 3 is an axial sectional view showing the structure of an electric power steering system according to another embodiment of the invention. As shown in FIG. 3, the electric power steering system is a unit that includes a speed reducer and the brushless motor 3 that rotates the speed reducer.

Next, description will be provided on the operation and effect of the electric oil pump device 1 according to the present embodiment configured as described above.

According to the above configuration, in the electric oil pump device 1 in which the brushless motor (electric motor) 3 and the controller 4 are arranged next to the oil pump 2 and are arranged side by side in the direction of the central axis of the oil pump 2, the cylindrical flange portion 23, the fixing member 8 made of metal, and the holding member 17 made of metal are connected to each other. The flange portion 23 projects from the end face of the pump housing 15, which is adjacent to the brushless motor 3. The fixing member 8 has a thin cylindrical shape, and is used to fix the stator 5 of the brushless motor 3. The holding member 17 supports the bearing 12 disposed on the rotary drive shaft 7 at a position on one side of the rotor 6. That is, the outer periphery of the fixing member 8 is fitted to the inner periphery of the flange portion 23 of the pump housing 15. Further, the stepped portion is formed in the axial end portion of the outer periphery of the holding member 17, and the stepped portion is formed in the one axial end portion of the inner periphery of the fixing member 8. The stepped portion of the holding member 17 and the stepped portion of the fixing member 8 extend in the circumferential direction, and the outer periphery of the stepped portion of the holding member 17 is engaged with the inner periphery of the stepped portion of the fixing member 8.

With this structure, it is possible to easily perform centering of the rotor 6 supported by the bearings 11, 12 arranged at two axial positions of the rotary drive shaft 7, via the holding member 17, and to perform centering of the stator 5 via the fixing member 8, using the outer diameters of the rotor 6 and the stator 5 as references. As a result, it is possible to suppress generation of vibrations and abnormal noise of the brushless motor 3. Furthermore, when the pump housing 15 and the holding member 17 are fastened with the bolts 21, the stator 5 is pushed toward the pump housing 15 via the fixing member 8 by the fastening force of the bolts 21. Therefore, it is possible to perform centering of the inner periphery of the stator 5 and centering of the rotor 6 at the same time, thereby reliably fixing the brushless motor 3 and the oil pump 2 to each other. Further, heat dissipation of the stator 5 is efficiently performed by the fixing member 8.

Furthermore, when the controller 4 is fixed to the brushless motor 3 and the motor housing 24 and the lid 25 are assembled together as in the above-described embodiment, a space is formed between the motor housing and the lid, and the outer periphery of the brushless motor 3 in the thickness direction of the flange portion 23. Therefore, operating noise of the brushless motor 3 is prevented from being transmitted directly to the motor housing 24, and noise insulation effect may be obtained.

As described above, according to the present embodiment, it is possible to provide the electric oil pump device that is assembled with high accuracy and that make it possible to reduce vibrations and abnormal noise of the motor.

The embodiments of the invention has been described above. However, the invention may be implemented in various other embodiments.

In the above-described embodiments, the stepped portion that extends in parallel with the axial direction is formed in the outer periphery of the holding member 17, and the stepped portion is brought into contact with the fixing member 8. However, the invention is not limited to this, and any configurations may be employed as long as centering of the stator 5 and centering of the rotor 6 are performed at the same time by the fastening force between the pump housing 15 and the holding member 17 and the oil pump 2 and the brushless motor 3 are fixed to each other, when the pump housing 15 and the holding member 17 are fastened with the bolts 21.

In the above-described embodiments, the controller 4 is fixed to the brushless motor 3 in the axial direction and housed together with the brushless motor 3 in the motor housing 24. However, the invention is not limited to this, and the controller 4 may be fixed to the brushless motor 3 in the radial direction, or may be disposed separately from the brushless motor 3.

In the above-described embodiments, connecting means for connecting the brushless motor 3 and the oil pump 2 to each other is applied to the electric oil pump device 1, and the brushless motor 3 is applied to the electric power steering system. However, the invention is not limited to these, and the invention may be applied to another device in which the brushless motor 3 is used.

What is claimed is:

1. An electric motor that is disposed adjacent to a housing of a rotated member serving as a load of the electric motor, the electric motor being configured to rotate the rotated member about a central axis of the rotated member, the electric motor comprising:
    a rotary drive shaft,
    a rotor rotatable with the rotary drive shaft;
    a stator fixed at a position radially outward of an outer periphery of the rotor;
    a flange portion that projects from an end face of the housing of the rotated member;
    a fixing member that is a metal member, the fixing member being fixed to a periphery of the stator of the electric motor, the fixing member having a first axial end and a second axial end;
    a holding member that is a metal member provided with a bearing that supports one side of a rotor of the electric motor; and
    a fastening member extending through the holding member and the fixing member in an axial direction and being fixedly received by the housing of the rotated member to couple the holding member to the housing of the rotated member by a fastening force, wherein
    the motor is fixed to the rotated member by the fastening force between the holding member and the housing of the rotated member,
    an outer periphery of the first axial end of the fixing member is fitted to an inner periphery of the flange portion, and an outer periphery of the holding member is fitted to an inner periphery of the second axial end of the fixing member, and
    a first end of the rotary drive shaft is supported by a first bearing in the housing of the rotated member, and a second end of the rotary drive shaft is supported by a second bearing in the holding member.

2. An electric unit, comprising:
    the electric motor according to claim 1; and
    the rotated member configured to be rotated about the central axis by the electric motor.

3. The electric motor according to claim 1, wherein an axial end of the holding member includes a first stepped portion, and an axial end of the fixing member includes a second stepped portion.

4. The electric motor according to claim 3, wherein the first stepped portion and the second stepped portion extend in a circumferential direction.

5. The electric motor according to claim 4, wherein an outer periphery of the first stepped portion is engaged with an inner periphery of the second stepped portion.

6. The electric motor according to claim 1, wherein the fixing member is cylindrical.

7. The electric motor according to claim 1, further comprising a motor housing, the fixing member being arranged in the motor housing.

8. The electric motor according to claim 7, wherein the fixing member is arranged between the stator of the motor and the motor housing.

9. The electric motor according to claim 8, wherein the fixing member is spaced from the motor housing in a radial direction.

10. The electric motor according to claim 7, wherein the holding member is arranged in the motor housing.

11. The electric motor according to claim 1, wherein
the fixing member is configured to center the stator relative to the central axis of the rotated member, and
the holding member is configured to center the rotor relative to the central axis of the rotated member.

12. The electric motor according to claim 1, wherein the stator and the rotor are configured to be centered at the same time by the fastening force between the holding member and the rotated member.

13. The electric motor according to claim 1, further comprising a plurality of fasteners configured to couple the holding member to the housing of the rotated member with the fastening force.

14. The electric motor according to claim 1, wherein the stator comprises a plurality of split stator cores, the stators being fixed at their peripheries by the fixing member.

* * * * *